United States Patent [19]

Sonobe

[11] Patent Number: 4,918,491
[45] Date of Patent: Apr. 17, 1990

[54] EMISSION SPECTRAL WIDTH MEASURING APPARATUS FOR LIGHT SOURCE

[75] Inventor: Yoji Sonobe, Tokyo, Japan

[73] Assignee: Anritsu Corp., Tokyo, Japan

[21] Appl. No.: 211,452

[22] Filed: Jun. 24, 1988

[30] Foreign Application Priority Data

Jun. 30, 1987 [JP] Japan ................................ 62-161056

[51] Int. Cl.[4] ............................................... G01B 9/02
[52] U.S. Cl. ..................................... 356/345; 356/346; 356/349
[58] Field of Search ................. 356/300, 345, 346, 349

[56] References Cited

U.S. PATENT DOCUMENTS 4,790,655 12/1988 Yamamoto et al. ................ 356/345

OTHER PUBLICATIONS

Novel Method for High Resolution Measurement of Laser Output Spectrum, Electronics Letters; Jul. 31, 1980, vol. 16, No. 16, pp. 630–631.

Primary Examiner—F. L. Evans
Attorney, Agent, or Firm—Frishauf, Holtz, Goodman & Woodward

[57] ABSTRACT

A measurement beam emitted from a laser diode is split into two beams by a beam splitter, and one of the two beams is guided to a first port of an acoustic optical element. When a high-frequency signal is applied from a diffraction controller to a piezoelectric transducer, the split beam input into the acoustic optical element from the first port is diffracted and frequency-shifted and output from a second port. If the high-frequency signal is not applied, the input beam rectilinearly propagates without diffracting and is output from a third port. This output beam is guided to a fourth port through an optical fiber. The beam input from the fourth port rectilinearly propagates and is output from the second port. The beam output from the second port is mixed with the other measurement beams split by the beam splitter to be converted to an electrical signal. The electrical signal is analyzed by a spectrum analyzer. When the high-frequency signal is applied to the piezoelectric transducer, measurement using optical heterodyne spectroscopy is performed, and when the high-frequency signal is not applied, measurement using optical homodyne spectroscopy is performed.

17 Claims, 3 Drawing Sheets

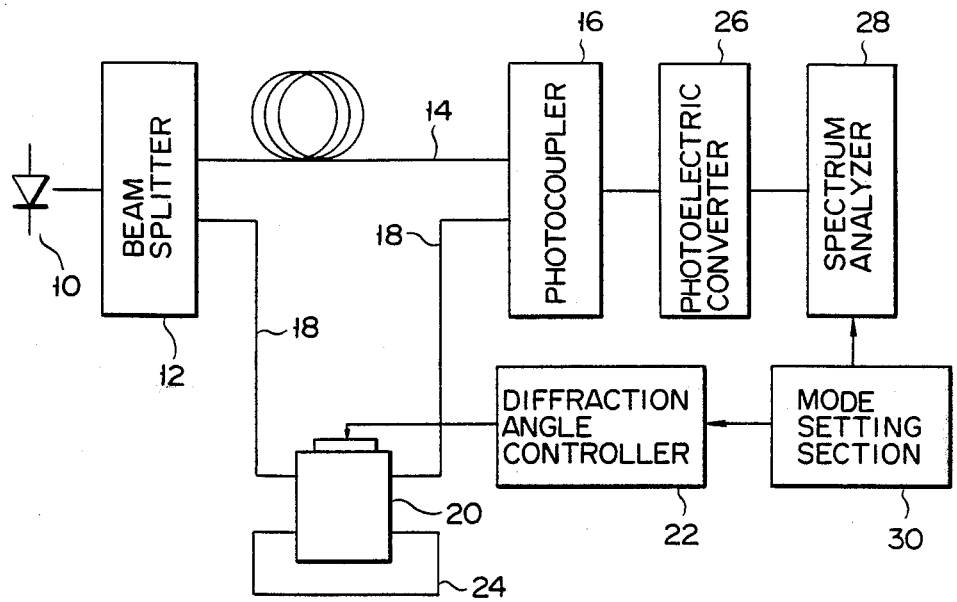
F I G. 1
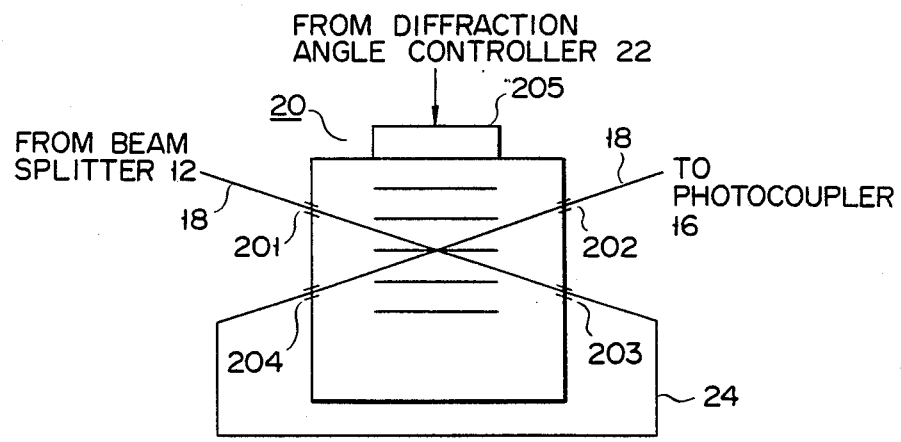
F I G. 2

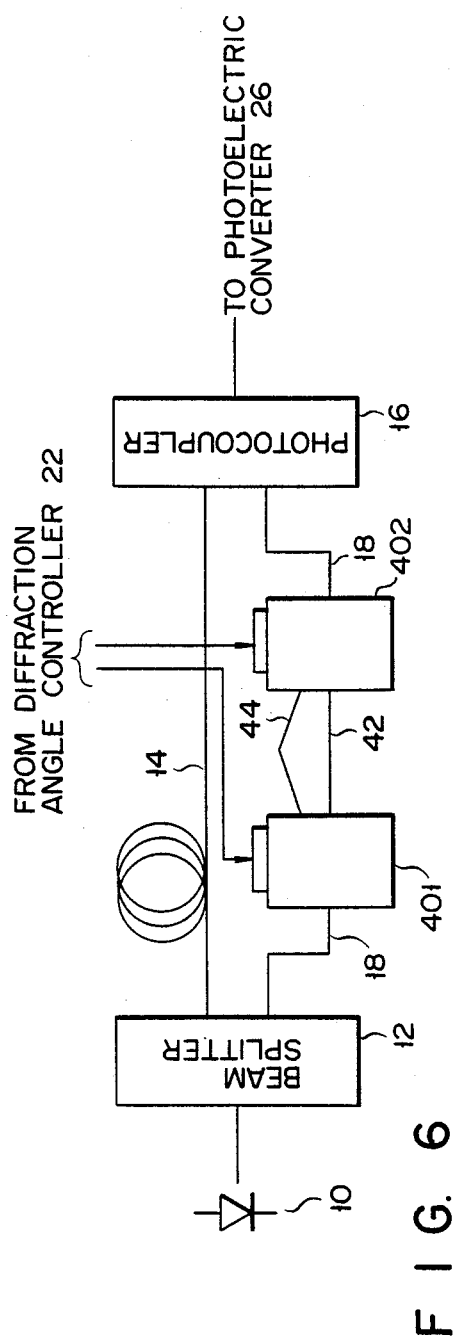
F I G. 6
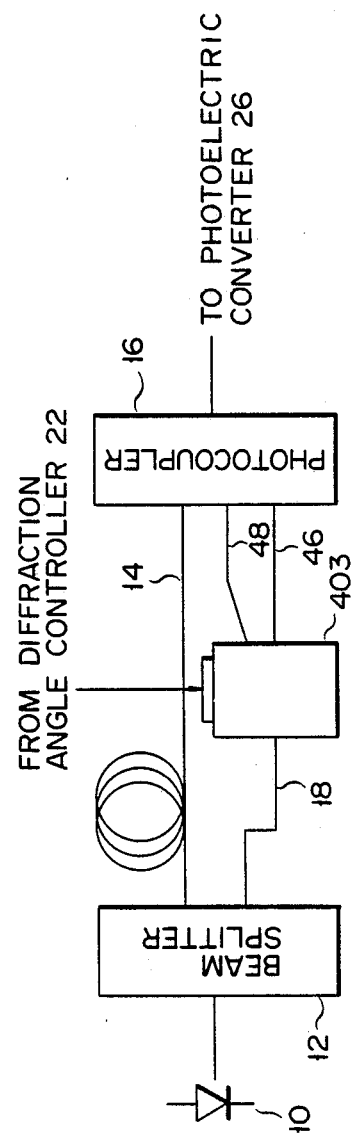
F I G. 7

EMISSION SPECTRAL WIDTH MEASURING APPARATUS FOR LIGHT SOURCE

BACKGROUND OF THE INVENTION

1. Field of the Invention

The present invention relates to an apparatus for measuring an emission spectral width of a light source used for coherent optical communication or the like and, more particularly, to an emission spectral width measuring apparatus for a light source which can commonly use optical homodyne spectroscopy and optical heterodyne spectroscopy as a measuring method.

2. Description of the Related Art

In recent years, extensive studies have been made for optical fiber communication. For example, coherent optical communication such as PCM-PSK or PCM-FSK, which fully utilizes a transmission capacity of an optical transmission path, has been studied. In order to realize such coherent optical communication, an emission spectral purity of a light source (e.g., a laser diode) must be improved. For this purpose, an emission spectrum of the laser diode must be measured at high resolution. As an apparatus for measuring an emission spectral width of a laser diode as the light source, two types of apparatuses respectively using optical homodyne spectroscopy and optical heterodyne spectroscopy have been developed.

The measuring apparatus using optical homodyne spectroscopy comprises a light source, a beam splitter, a single-mode delay optical fiber, a signal-mode non-delay optical fiber, a photocoupler, a photoelectric converter, and a spectrum analyzer. More specifically, a light beam to be measured (to be referred to as a measurement beam hereinafter) from a diode as the light source is split in two directions by the beam splitter. One of these split measurement beams is guided to the photocoupler through the single-mode delay optical fiber, and the other beam is also guided thereto through the single-mode non-delay optical fiber. The optically coupled measurement beams are converted into an electrical signal by the photoelectric converter, and the electrical signal is supplied to the spectrum analyzer. The spectrum analyzer analyzes the frequency of the electrical signal and displays its spectrum waveform. More specifically, in the measuring apparatus using optical homodyne spectroscopy, a measurement beam which has a frequency $f_O$ and a line width $\Delta f$ and is output from the laser diode through the non-delay optical fiber, and a measurement beam which has a frequency $f_O$ and a line width $\Delta f$ and is output through the delay optical fiber are mixed, so that a spectrum waveform of an intermediate frequency signal having zero as the center frequency $f_c$ and $2\Delta f$ as the spectrum width is displayed on the spectrum analyzer. The spectrum waveform is observed to measure an emission spectral width of the light source.

The measuring apparatus using optical heterodyne spectroscopy comprises a measurement laser diode, a local oscillation laser diode, a photocoupler, a photoelectric converter, and a spectrum analyzer. More specifically, the local oscillation laser diode outputs a locally oscillated beam which has a frequency approximate to that of a measurement beam from the measurement laser diode and has high spectral purity. The photocoupler frequency-mixes these measurement and locally oscillated beams to obtain an intermediate frequency signal. The intermediate frequency signal is converted into an electrical signal by the photoelectric converter, and the electrical signal is supplied to the spectrum analyzer. The spectrum analyzer analyzes the frequency of the electrical signal, and displays its spectrum waveform. The spectrum waveform is observed to measure an emission spectral width of the light source.

In the apparatus using optical heterodyne spectroscopy, a local oscillation laser diode which has extremely high spectral purity and a frequency approximate to that of a measurement beam is necessary. However, it is difficult to make a local oscillation laser diode having such functions.

A measuring apparatus using delayed self-heterodyne spectroscopy has been developed, as described in "NOVEL METHOD FOR HIGH RESOLUTION MEASUREMENT OF LASER OUTPUT SPECTRUM", ELECTRONICS LETTERS 31st July 1980 Vol. 16 No. 16, pp. 630–631. This apparatus can be obtained by adding an acoustic optical element and an oscillator for driving the element to the apparatus using optical homodyne spectroscopy described above. More specifically, the acoustic optical element is arranged midway along the non-delay optical fiber. The acoustic optical element diffracts one of the two beams split by the beam splitter, and frequency-shifts the diffracted beam by a frequency fa corresponding to the oscillation frequency of the oscillator. Then, the acoustic optical element outputs the frequency-shifted diffracted beam. The diffracted beam propagating through the non-delay optical fiber is mixed with a measurement beam propagating through the delay optical fiber, thereby obtaining an intermediate frequency signal having a center frequency $f_a$. In this case, when a delay time of the delay optical fiber is set to be longer than a coherence time of the measurement beam, correlation of phases can be removed, and an intermediate frequency signal having a spectral width twice that of the measurement beam can be observed. Therefore, the emission spectral width of the light source can be obtained from the intermediate frequency signal spectrum.

In the measuring apparatus using optical homodyne spectroscopy, the peak vale of a spectrum waveform which has a large spectral width can be easily observed. However, in the case of a spectrum waveform having a small spectral width, the top of the waveform overlaps the line of center frequency fc of the intermediate frequency signal (i.e., the left end of the display screen of the spectrum analyzer). As a result, it is difficult to observe the peak point, thus degrading measurement precision of a spectral width.

In the measuring apparatus using delay self heterodyne spectroscopy, on the contrary, the spectral width of a spectrum waveform having a small spectral width can be precisely measured. However, in the case of a spectrum waveform having a large spectral width, the bottom portion of the spectrum waveform is concealed by the zero portion of the spectrum analyzer (i.e., the left end of the display screen of the spectrum analyzer), or right and left waveforms having center frequency $f_a$ as the center undesirably become asymmetrical. Thus, the spectrum waveform cannot be accurately measured.

Therefore, when an emission spectral width of a light source used in optical communication is measured, two measuring apparatuses must always be provided, and must be selectively used in accordance with each type of spectrum waveform so as to measure an emission spectral width of a target light source.

SUMMARY OF THE INVENTION

The present invention has been made in consideration of the above situation and has as its object to provide an emission spectral width measuring apparatus for a light source which can perform measurement in both optical homodyne and heterodyne spectroscopies, and can accurately measure a wide range of emission spectral width of a light source.

More specifically, according to one aspect of the invention, an emission spectral width measuring apparatus for a light source comprising beam splitter means for receiving and splitting a measurement beam emitted from the light source to obtain first and second split beams; first optical fiber means for receiving and guiding the first split beam from the beam splitter means; second optical fiber means for receiving and guiding the second split beam from the beam splitter means; photocoupler means for receiving the first and second split beams propagating through the first and second optical fiber means and mixing the first and second split beams to obtain an intermediate frequency signal; spectrum analyzer means for receiving the intermediate frequency signal obtain by the photocoupler means and analyzing a frequency of the intermediate frequency signal to display a spectrum waveform; acoustic optical means, arranged substantially midway along the second optical fiber means, the acoustic optical means having a shift path for diffracting and frequency-shifting an input beam and outputting the frequency-shifted diffracted beam to the second optical fiber means, and a transmission path for causing an input beam to rectilinearly propagate therethrough without light diffraction and outputting the transmission beam to the second optical fiber means; and diffraction control means for controlling the acoustic optical means to switch the shift path and the transmission path.

According to another aspect of the invention, an emission spectral width measuring apparatus for a light source comprises beam splitter means for receiving and splitting a measurement beam emitted from the light source to obtain first and second split beams; first optical fiber means for receiving and guiding the first split beam from the beam splitter means; second optical fiber means for receiving and guiding the second split beam from the beam splitter means; acoustic optical means connected to the second optical fiber means to receive the second split beam, the acoustic optical means having a shift path for diffracting and frequency-shifting an input beam and outputting the frequency-shifted diffracted beam, and a transmission path for causing an input beam to rectilinearly propagate therethrough without light diffraction and outputting the transmission beam; third optical fiber means for receiving and guiding a beam output through the shift path of said acoustic optical means, fourth optical fiber means for receiving and guiding a beam output through the transmission path of the acoustic optical means; diffraction control means for controlling the acoustic optical means to switch the shift path and the transmission path so as to cause one of the third and fourth optical fiber means to output the beam from the acoustic optical means; photocoupler means for receiving the first split beam propagating through the first optical fiber means and the beam output from the acoustic optical means propagating through one of the third and fourth optical fiber means and mixing the beams to obtain an intermediate frequency signal; and spectrum analyzer means for receiving the intermediate frequency signal obtained by and photocoupler means and analyzing a frequency of the intermediate frequency signal to display a spectrum waveform.

BRIEF DESCRIPTION OF THE DRAWINGS

FIG. 1 is a block diagram showing an arrangement of an embodiment of an emission spectral width measuring apparatus for a light source according to the present invention;

FIG. 2 is a view showing an arrangement of an acoustic optical element shown in FIG. 1;

FIG. 6 is a block diagram showing an arrangement of another embodiment of an emission spectral width measuring apparatus for a light source according to the present invention; and FIG. 7 is a block diagram showing an arrangement of still another embodiment of an emission spectral width measuring apparatus for a light source according to the present invention.

DETAILED DESCRIPTION OF THE PREFERRED EMBODIMENTS

Figure 3A:
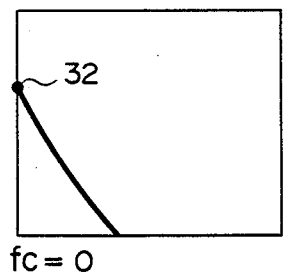
FIGS. 3A and 3B are views showing display states of a spectrum analyzer shown in FIG. 1 when measurement is performed using optical homodyne spectroscopy.

As is shown in FIG. 1, a measurement beam from a measurement light source, e.g., laser diode 10, is input to beam splitter 12. Beam splitter 12 splits the input measurement beam in two directions. One split output terminal of beam splitter 12 is coupled to delay optical fiber 14. The other end of optical fiber 14 is coupled to one optical input terminal of photocoupler 16. As beam splitter 12 and photocoupler 16, an optical directional coupler, a beam splitter, an optical branching waveguide, and the like are known. The other split output terminal of beam splitter 12 is coupled to optical fiber 18. The other end of optical fiber 18 is coupled to the other optical input terminal of photocoupler 16. Note that acoustic optical element 20 is arranged midway along optical fiber 18.

Acoustic optical element 20 comprises four ports 201 to 204, as is shown in FIG. 2, and optical fiber 18 is coupled to ports 201 and 202. Element 20 further comprises piezoelectric transducer 205 in which an electrode is deposited on a $ZnO_2$ thin film or the like. Piezoelectric transducer 205 is connected to diffraction angle controller 22 which includes, e.g., an oscillator. Diffraction angle controller 22 applies a required high-frequency signal to piezoelectric transducer 205 to diffract a measurement beam input at first port 201 of acoustic optical element 20 and to frequency-shift the diffracted beam by a frequency of the high-frequency signal. Then, element 20 outputs the frequency-shifted diffracted beam from second port 202. Controller 22 also has a function of varying a diffraction angle by selecting the frequency of the high-frequency signal. The diffraction angle may be varied to correct for a diffraction angle of a diffracted beam which may have been shifted as a result of a difference in wavelength of a measurement beam generated by light source 10, and to diffract the beam at a constant diffraction angle.

Optical fiber 24 is connected between third and fourth ports 203 and 204 of acoustic optical element 20. More specifically, element 20 has a shift path for diffracting and frequency-shifting a measurement beam input from first port 201 and for outputting the frequency-shifted diffracted beam from second port 202. Element 20 also has a transmission path for causing a measurement beam, which rectilinearly propagates from first port 201, to be input to fourth port 204 through third port 203 and optical fiber 24, and for causing the beam to rectilinearly propagate through element 20 from fourth port 204 and to be output from second port 202. In element 20, when piezoelectric transducer 205 is driven by diffraction angle controller 22, the shift path is valid. Contrary to this, when the piezoelectric transducer is de-energized, the transmission path is valid.

Photocoupler 16 mixes input from optical fibers 14 and 18 to obtain an intermediate frequency signal, and supplies the signal to photoelectric converter 26 such as a photodiode. Photoelectric converter 26 supplies an electrical signal corresponding to the intermediate frequency signal to spectrum analyzer 28. Spectrum analyzer 28 analyzes the frequency of the electrical signal corresponding to the intermediate frequency signal, and displays its spectrum such that a frequency is plotted along the abscissa and a light intensity is plotted along the ordinate. Upon observation of the spectrum waveform, the emission spectral width of laser diode 10 can be measured. In this case, different displays of a spectrum are made depending on whether the intermediate frequency signal was obtained from the shift path or the transmission path, i.e., whether optical heterodyne or homodyne spectroscopy was used. More specifically, spectrum analyzer 28 changes its display mode in accordance with a mode signal supplied from mode setting section 30 such as a host computer or a mode setting switch. Diffraction angle controller 22 switches a drive/non-drive state of piezoelectric transducer 20 in accordance with the mode signal supplied from mode setting section 30.

A case will now be described wherein the emission spectral width of the light source is measured using optical homodyne spectroscopy in the measuring apparatus with the above arrangement. More specifically, a mode signal indicating measurement using optical homodyne spectroscopy is supplied from mode setting section 30 to diffraction angle controller 22 and spectrum analyzer 28. In accordance with the mode signal, controller 22 sets acoustic optical element 20 in a non-drive state. More specifically, controller 22 stops the supply of a high-frequency signal to piezoelectric transducer 205 in element 20.

In this state, when a measurement beam is generated by laser diode 10, the beam is split into two beams by beam splitter 12. One of the split beams is sent to photocoupler 16 through delay optical fiber 14. The other split beam is input to acoustic optical element 20 through optical fiber 18. In this case, since element 20 is in the non-drive state, as described above, the transmission path is formed. Thus, the measurement beam input to first port 201 of element 20 rectilinearly propagates through element 20 and is output from third port 203. The beam output from third port 203 propagates through light transmission optical fiber 24 and then enters element 20 through fourth port 204. Then, the beam rectilinearly propagates through element 20 and is output from second port 202. The beam output from second port 202 is input to photocoupler 16 through optical fiber 18.

The beams output from optical fibers 14 and 18 are mixed by photocoupler 16, and are converted to an intermediate frequency signal. The intermediate frequency signal is converted to an electrical signal by photoelectric converter 26, and the electrical signal is supplied to spectrum analyzer 28. Analyzer 28 analyzes the frequency of this signal, and displays its spectrum waveform. Upon observation of the spectrum waveform, an emission spectral width of laser diode 10 can be measured. In this case, spectrum analyzer 28 displays the spectrum waveform such that a frequency is plotted along the abscissa and a light intensity is plotted along the ordinate to have zero as center frequency $f_c$, as is shown in FIG. 3A.

When an emission spectral width of the light source is measured using optical heterodyne spectroscopy, a mode signal indicating measurement using optical heterodyne spectroscopy is supplied from mode setting section 30 to controller 22 and spectrum analyzer 28. In accordance with the mode signal, controller 22 sets acoustic optical element 20 in the drive state. More specifically, controller 22 applies a high-frequency signal of predetermined frequency $f_a$ to piezoelectric transducer 205 in element 20.

In this state, when a measurement beam is generated by laser diode 10, the measurement beam from laser diode 10 is split into two beams by beam splitter 12. One of the two split beams is guided to photocoupler 16 through delay optical fiber 14. The other split beam is input to acoustic optical element 20 through optical fiber 18. In this case, sine element 20 is in the drive state, as described above, the shift path is formed. Thus, the measurement beam input to first port 201 of element 20 is diffracted based on a change in refractive index due to a low density of the high-frequency signal in element 20, and is frequency-shifted by a predetermined frequency, i.e., frequency $f_a$ of the high-frequency signal. Then, the obtained beam is output from second port 202. The beam output from second port 202 is input to photocoupler 16 through optical fiber 18.

The beams output from optical fibers 14 and 18 are mixed by photocoupler 16, and are converted to an intermediate frequency signal. The intermediate frequency signal is converted to an electrical signal by photoelectric converter 26, and the electrical signal is supplied to spectrum analyzer 28. Analyzer 28 analyzes the frequency of this signal, and displays its spectrum waveform. Upon observation of the spectrum waveform, an emission spectral width of laser diode 10 can be measured. In this case, spectrum analyzer 28 displays the spectrum waveform such that a frequency is plotted along the abscissa and a light intensity is plotted along the ordinate to have shifted frequency $f_a$ as the center frequency, as is shown in FIG. 4A.

According to the arrangement of the embodiment described above, acoustic optical element 20 which has the shift path for achieving frequency shift by light diffraction and the transmission path for allowing light to pass therethrough without light diffraction is arranged in an optical path of the split beam, and a beam input to element 20 rectilinearly propagates or is diffracted in accordance with measurement by optical homodyne or heterodyne spectroscopy. The two measuring methods can be commonly performed by a single apparatus, and handling and measurement can be facilitated. The paths in element 20 are switched while observing the spectrum waveform displayed on spectrum analyzer 28, thereby preventing a problem of disturbing a spectrum waveform in accordance with a spectral width of a measurement beam. This can provide the following advantages. That is, a wide range of spectral width from a small width to a large width of a spectrum can be accurately measured, and accuracy of measurement can be assured.

Figure 3B:
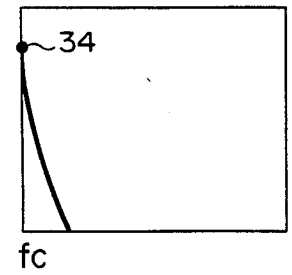

More specifically, when measurement is performed by optical homodyne spectroscopy, if a spectrum waveform has a large spectral width, a peak value 32 of the waveform can be easily observed, as is shown in FIG. 3A. However, if a spectrum waveform has a small spectral width, as is shown in FIG. 3B, the top portion of the waveform overlaps the line of center frequency $f_c$ of an intermediate frequency signal. As a result, it is very difficult to observe peak point 34, thus degrading measurement precision of the spectral width. In this case, the measurement mode can be switched to use optical heterodyne spectroscopy, and a spectral width can be accurately measured.

Figure 4A:
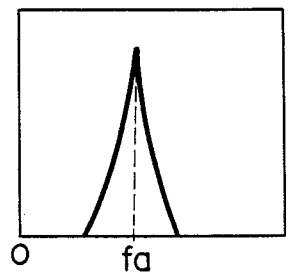
FIGS. 4A and 4B are views showing display states of the spectrum analyzer shown in FIG. 1 when measurement is performed using optical heterodyne spectroscopy.
Figure 4B:
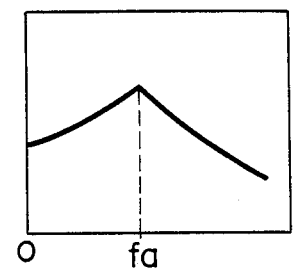

On the contrary, when measurement is performed by optical heterodyne spectroscopy, if a spectrum waveform has a small spectral width, the spectral width can be accurately observed, as is shown in FIG. 4A. However, if a spectrum waveform has a large spectral width, as is shown in FIG. 4B, the bottom portion of the spectrum waveform is concealed by the zero portion of the display unit of spectrum analyzer 28, or the right and left waveforms having center frequency fa as the center become asymmetrical, and an emission spectral width cannot be accurately measured. In this case, the measurement mode can be switched to use optical homodyne spectroscopy, and the spectral width can be accurately measured.

When the emission spectral width of a light source used in coherent optical communication is measured, since both the measurement modes using optical homodyne and heterodyne spectroscopies can be achieved by a single apparatus, a wide range of spectral width from a small width to large width of a spectrum can be accurately measured.

Figure 5:
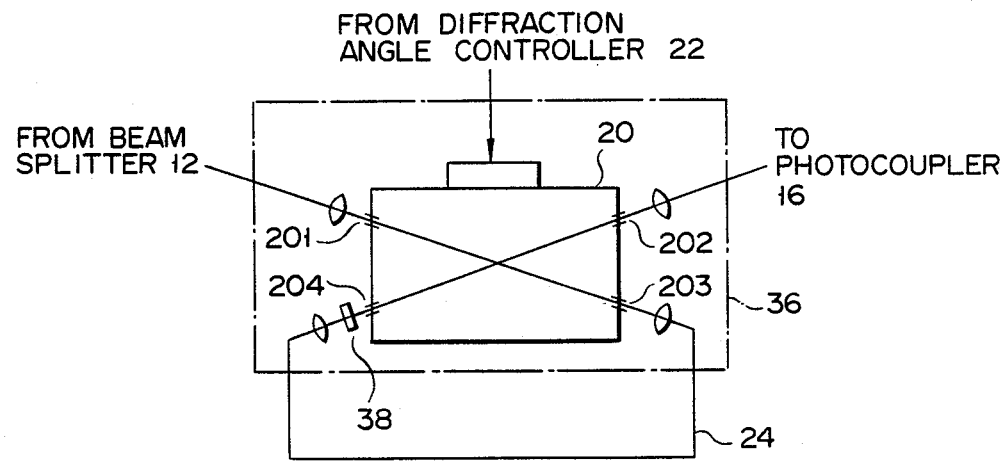
FIG. 5 is a view showing another arrangement of the acoustic optical element.

The present invention is not limited to the above embodiment. In the arrangement of acoustic optical element 20, optical switch 38 may be arranged near fourth port 204 in element 20 or outside element 20 in the case of acoustic optical element module 36 shown in FIG. 5, so that optical switch 38 is ON/OFF-controlled in accordance with the measurement modes using optical homodyne and heterodyne spectroscopies. More specifically, when the measurement is performed by optical heterodyne spectroscopy, optical switch 38 is turned off, so that a beam leaking from third port 203 is cut at a portion near fourth port 204 so as not to be output from second port 202. Thus, a spectral width can be more accurately measured. Note that an arrangement for ON/OFF-controlling optical switch 38 is known to those skilled in the art, and a description thereof will be omitted herein.

As another apparatus according to the present invention, as is shown in FIG. 6, a plurality of 3-port acoustic optical elements 401 and 402 may be arranged between the other split output terminal of beam splitter 12 and the other input terminal of photocoupler 16. In the apparatus of this arrangement, a split beam from beam splitter 12 is transmitted through acoustic optical element 401, optical fiber 42, and acoustic optical element 402 and is guided to photocoupler 16 during measurement by optical homodyne spectroscopy. During measurement by optical heterodyne spectroscopy, acoustic optical elements 401 and 402 are simultaneously driven at an identical frequency or different frequencies, so that a split beam from beam splitter 12 is diffracted and frequency-shifted by elements 401 and 402. More specifically, the split beam from beam splitter 12 is input to photocoupler 16 as the frequency-shifted diffracted beam through acoustic optical element 401, optical fiber 44, and acoustic optical element 402. With this arrangement, existing acoustic optical elements each having three ports can be employed as elements 401 and 402, and a doubled shift frequency can be obtained.

As still another apparatus according to the present invention, as is shown in FIG. 7, one 3-port acoustic optical element 403 is used, and a beam from a rectilinear transmission beam port at the light output side of element 403 is guided to photocoupler 16 through optical fiber 46, and a beam from a diffracted light port is guided to photocoupler 16 through optical fiber 48. In this case, photocoupler 16 selectively receives the transmission and diffracted beams from element 403 in accordance with switching between optical homodyne and heterodyne spectroscopies, and mixes the received beam with a split beam from another optical fiber 14. In the apparatus of this arrangement, a split beam from beam splitter 12 is transmitted through acoustic optical element 403 and optical fiber 46 and is guided to photocoupler 16 during measurement by optical homodyne spectroscopy. Photocoupler 16 then receives the transmission beam from optical fiber 46, and mixes it with a split beam from another optical fiber 14. During measurement by optical heterodyne spectroscopy, a split beam from beam splitter 12 is diffracted and frequency-shifted by element 403, and is guided to photocoupler 16 through optical fiber 48. Thus, photocoupler 16 receives the diffracted beam from optical fiber 48, and mixes it with a split beam from another optical fiber 14.

Various other changes and modifications may be made within the spirit and scope of the invention.

According to an emission spectral width measuring apparatus for a light source according to the present invention, an acoustic optical element having a path for diffracting and frequency-shifting a beam and a path for rectilinearly transmitting a beam therethrough is arranged along an optical path of a split beam, and the paths of the acoustic optical element are selectively used to guide a split beam to a photocoupler in accordance with the measurement modes using optical homodyne and heterodyne spectroscopies. Thus, the two measuring methods can be used by a single apparatus, and handling and measurement of a spectral width can be facilitated. The measuring method is appropriately selected in accordance with the spectral width and a spectrum waveform state, thus eliminating a variation in waveform due to the spectral width. Thus, a wide range of spectrum waveform from a small width to large width of spectrum can be measured. Therefore, an emission spectral width of a light source can be accurately measured.

What is claimed is:

1. An apparatus for measuring an emission spectral width of a light source, comprising:
   beam splitter means for receiving and splitting a measurement beam emitted from said light source to obtain first and second split beams;

first optical fiber means for receiving and guiding the first split beam from said beam splitter means;

second optical fiber means for receiving and guiding the second split beam from said beam splitter means;

photocoupler means for receiving the first and second split beams propagating through said first and second optical fiber means, and for mixing the received first and second split beams to obtain an intermediate frequency signal;

spectrum analyzer means for receiving the intermediate frequency signal obtained by said photocoupler means and for analyzing a frequency of the intermediate frequency signal to display a spectrum waveform;

acoustic optical means arranged substantially midway along said second optical fiber means, said acoustic optical means having a shift path for diffracting and frequency-shifting an input beam and outputting the frequency-shifted diffracted beam to said second optical fiber means, and a transmission path for causing an input beam to rectilinearly propagate therethrough without light diffraction and outputting the transmission beam to said second optical fiber means; and diffraction control means for controlling said acoustic optical means to switch said shift path and said transmission path.

2. The apparatus according to claim 1, wherein, in a measurement mode using optical homodyne spectroscopy, said diffraction control means controls said acoustic optical means to cause the input beam to propagate through said transmission path; and in a measurement mode using optical heterodyne spectroscopy, said diffraction control means controls said acoustic optical means to cause the input beam to propagate through said shift path.

3. The apparatus according to claim 2, wherein when said acoustic optical means receives a high-frequency signal from said diffraction control means, the input beam propagates through said shift path to be diffracted and frequency-shifted by a frequency of the high-frequency signal, and the beam is output to said second optical fiber means.

4. The apparatus according to claim 3, wherein said acoustic optical means includes an acoustic optical element having first to fourth ports, said first port is connected to said second optical fiber means so as to receive the second split beam from said beam splitter means, said second port is connected to said second optical fiber means so as to guide a beam output from said acoustic optical element to said photocoupler means; and third optical fiber means which is connected between said third and fourth ports.

5. The apparatus according to claim 4, wherein, in said acoustic optical element, said second port is in a position such that the diffracted beam is output therefrom when the second split beam input at said first port is diffracted, said third port is in a position such that the beam is output therefrom when the second split beam input at said first port is caused to rectilinearly propagate without diffracting, and said fourth port is in a predetermined position such that when a beam input at said fourth port is caused to rectilinearly propagate, the beam is output from said second port.

6. The apparatus according to claim 5, wherein said acoustic optical element includes means for determining a diffraction angle in accordance with the frequency of the high-frequency signal applied from said diffraction control means.

7. The apparatus according to claim 2, further comprising mode setting means for setting one of the measurement modes using optical homodyne and heterodyne spectroscopies; and wherein said diffraction control means controls the paths of said acoustic optical means in accordance with a mode signal supplied from said mode setting means.

8. The apparatus according to claim 3, wherein said acoustic optical means includes first and second acoustic optical elements each having first to third ports, and third and fourth optical fiber means, the first port of said first acoustic optical element being connected to said second optical fiber means so as to receive the second split beam from said beam splitter means, the second port of said first acoustic optical element being connected to the second port of said second acoustic optical element through said third optical fiber means, the third port of said first acoustic optical element being connected to the third port of said second acoustic optical element through said fourth optical fiber means, and the first port of said second acoustic optical element being connected to said second optical fiber means so as to guide a beam output from said second acoustic optical element to said photocoupler means.

9. The apparatus according to claim 8, wherein, in said first acoustic optical element, the second port is in a position such that the diffracted beam is output therefrom when the second split beam input at the first port is diffracted, the third port is in a position such that the beam is output therefrom when the second split beam input at the first port is caused to rectilinearly propagate without diffracting; and in said second acoustic optical element, the first port is in a position such that the beam is output therefrom when a beam input at the second port is diffracted and when a beam input at the third port is caused to rectilinearly propagate without diffracting.

10. The apparatus according to claim 9, wherein each of said first and second acoustic optical elements includes means for determining a diffraction angle in accordance with the frequency of the high-frequency signal applied from said diffraction control means.

11. An apparatus for measuring an emission spectral width of a light source, comprising:

beam splitter means for receiving and splitting a measurement beam emitted from said light source to obtain first and second split beams;

first optical fiber means for receiving and guiding the first split beam from said beam splitter means;

second optical fiber means for receiving and guiding the second split beam from said beam splitter means;

acoustic optical means connected to said second optical fiber means to receive the second split beam, said acoustic optical means having a shift path for diffracting and frequency-shifting an input beam and outputting the frequency-shifted diffracted beam, and a transmission path for causing an input beam to rectilinearly propagate therethrough without light diffraction and outputting the transmission beam;

third optical fiber means for receiving and guiding a beam output through said shift path of said acoustic optical means;

fourth optical fiber means for receiving and guiding a beam output through said transmission path of said acoustic optical means;

diffraction control means for controlling said acoustic optical means to switch said shift path and said transmission path so as to cause one of said third and fourth optical fiber means to output the beam from said acoustic optical means;

photocoupler means for receiving the first split beam propagating through said first optical fiber means and the beam output from said acoustic optical means propagating through one of said third and fourth optical fiber means, and for mixing the received beams to obtain an intermediate frequency signal; and spectrum analyzer means for receiving the intermediate frequency signal obtained by said photocoupler means, and for analyzing a frequency of the intermediate frequency signal to display a spectrum waveform.

12. The apparatus according to claim 11, wherein, in a measurement mode using optical homodyne spectroscopy, said diffraction control means controls said acoustic optical means to cause the input beam to propagate through said transmission path; and in a measurement mode using optical heterodyne spectroscopy, said diffraction control means controls said acoustic optical means to cause the input beam to propagate through said shift path.

13. The apparatus according to claim 12, wherein, when said acoustic optical means receives a high-frequency signal from said diffraction control means, the input beam propagates through said shift path to be diffracted and frequency-shifted by a frequency of the high-frequency signal, and the beam is output to said third optical fiber means.

14. The apparatus according to claim 13, wherein said acoustic optical means includes an acoustic optical element having first to third ports, the first port being connected to said second optical fiber means so as to receive the second split beam from said beam splitter means, the second port being connected to said third optical fiber means so as to guide a diffracted beam output from said acoustic optical element to said photocoupler means, and the third port being connected to said fourth optical fiber means so as to guide a transmission beam output from said acoustic optical element to said photocoupler means.

15. The apparatus according to claim 14, wherein, in said acoustic optical element, the second port is in a position such that the diffracted beam is output therefrom when the second split beam input at the first port is diffracted, and the third port is in a position such that the beam is output therefrom when the second split beam input at the first port is caused to rectilinearly propagate without diffracting.

16. The apparatus according to claim 15, wherein said acoustic optical element includes means for determining a diffraction angle in accordance with the frequency of the high-frequency signal applied from said diffraction control means.

17. The apparatus according to claim 12, further comprising mode setting means for setting one of the measurement modes using optical homodyne and heterodyne spectroscopies; and wherein said diffraction control means controls the paths of said acoustic optical means in accordance with a mode signal supplied from said mode setting means.

* * * * *